Patented Feb. 22, 1949

2,462,133

UNITED STATES PATENT OFFICE 2,462,133

PROCESS OF TREATING PREGNENE COMPOUNDS

Lewis H. Sarett, Princeton, N. J., assignor to Merck & Co., Inc., Rahway, N. J., a corporation of New Jersey No Drawing. Original application July 14, 1945, Serial No. 605,194. Divided and this application February 23, 1946, Serial No. 649,768

4 Claims. (Cl. 260—397.3)

This invention is concerned generally with novel chemical compounds of the cyclopentanodimethylpolyhydrophenanthrene series and to processes of preparing same; more particularly it relates to novel compounds useful as intermediates in the synthesis of the adrenal cortical hormone $\Delta^{4,5}$-3,11,20-triketo-17($\beta$), 21-dihydroxy pregnene. This application is a divisional of copending application Serial No. 605,194 filed July 14, 1945, now abandoned.

This hormone is known to occur naturally in the adrenal cortex; it has the structural formula:

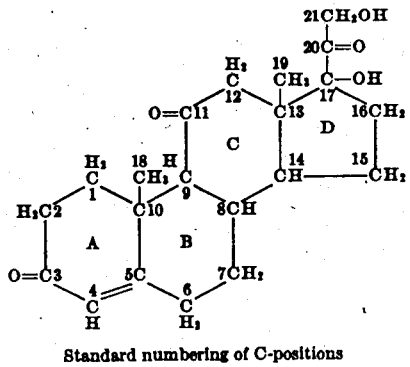

Standard numbering of C-positions

This formula, for purposes of convenience, is hereinafter reproduced below in the abbreviated form:

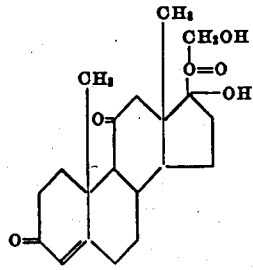

In the following description of the invention, the stereochemical relationships of substitutes are indicated by the following conventions:

1. A substituent at the C-3 position which is trans to the C-10 methyl group is parenthetically designated ($\alpha$).

2. A substituent at the C-17 position, the stereochemical configuration of which is identical with that of the naturally occurring adrenal hormones, is parenthetically designated ($\beta$); the epimeric configuration is designated ($\alpha$). In the structural formulae the former configuration is shown by writing the C-17 substituent (hydroxyl) to the right of the C-17 carbon side chain, thus

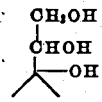

in the latter case above the side chain, thus

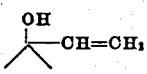

3. The stereochemical relationship of rings A and B is indicated in the formulae by a solid line representing the valence bond in the cis configuration.

The starting material employed in the processes according to this invention, $\Delta^{4,5}$-3,11-diketo-17,20,21-trihydroxypregnene can be prepared by simple hydrolysis using conventional methods, of $\Delta^{4,5}$ - 3,11 - diketo - 17-hydroxy-20,21-diacyloxypregnene, which may be obtained as described in copending application Serial No. 649,766, filed February 23, 1946.

In accordance with this invention, $\Delta^{4,5}$-3,11-diketo-17-20,21-trihydroxypregnene is partially acylated with an acid anhydride to yield $\Delta^{4,5}$-3,11-diketo - 17-20 - dihydroxy - 21 - acyloxypregnene having the structural formula:

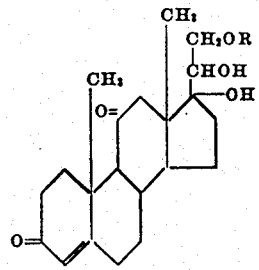

R being acyl. Among the acid anhydrides which are useful for this purpose are those derived from propionic, butyric, valeric, caproic or capric acid, preferably from a lower aliphatic acid, i. e. one having 6 carbon atoms or less. If preferred, the corresponding acid may be substituted in whole or part for the anhydride used, but the anhydrides are preferred. In effecting this partial acylation, it is important not to use an amount of acylating agent greatly in excess of an equimolecular proportion as otherwise loss of the desired monoacylated compound results because of formation of the undesired diacyl compound. Upon oxidation of this compound, e.g. with chromium trioxide, a mixture of $\Delta^{4,5}$-3,11,20-triketo-17- hydroxy - 21 - acyloxypregnene and $\Delta^{4,5}$-3,11,17-triketoandrostene results. The $\Delta^{4,5}$-3,11,20-triketo-17 ($\beta$)-hydroxy-21-acyloxypregnene has valuable therapeutic action and may be used as such or may be converted by saponification to the corresponding hydroxy compound, $\Delta^{4,5}$-3,11,20-triketo-17 ($\beta$)-21-dihydroxypregnene, variously known as Kendall's compound "E," Reichstein's compound "Fa" or Wintersteiner et al's compound "F."

The compounds $\Delta^{4,5}$-3,11,20-triketo-17 ($\beta$)-hydroxy-21-acyloxypregnene and $\Delta^{4,5}$-3,11,17-triketoandrostene may be separated from each other by the usual chromatographic methods and fractional crystallization. The compound $\Delta^{4,5}$-3-11,17-triketoandrostene, also known as adrenosterone, has been found to occur naturally in the adrenal cortex.

That oxidation of a compound of the cyclopentano-dimethylpolyhydrophenanthrene series having a 17-position substituent:

would result in a corresponding compound having a group:

in the same position (R is an acyl group) is particularly surprising. Prior art attempts to accomplish this heretofore in terms of reactions upon similar polynuclear compounds have led to splitting off of the side chain. According to this invention however the 17 substituent

in a compound of the cyclopentanodimethylpolyhydro-phenanthrene series is obtained even though the 17-hydroxyl group is not protected by conversion to an ester or other protective group, although the C-21 group, it will be noted, is protected against oxidation by acylation.

In practicing the instant invention, the oxidation is carried out under mild conditions, preferably at room temperature, in a medium having a pH of 1 to 7, using a strong oxidizing agent, preferably chromium trioxide. The preferred medium is aqueous acetic acid, although if desired other lower (6 carbon atoms or less) aliphatic monocarboxylic acids can be employed. Acetone also has been found to be a suitable medium for this oxidation reaction.

The following example illustrates the partial acetylation of $\Delta^{4,5}$-3-11-diketo-17 ($\beta$)-20,21-trihydroxypregnene, followed by the oxidation of the resultant compound to produce $\Delta^{4,5}$-3-11-20-triketo-17 ($\beta$)-hydroxy-21-acetoxypregnene and $\Delta^{4,5}$-3,11,17-triketoandrostene. It will be understood this example is for purposes of illustration and that the invention is not limited thereto.

Example 179.5 mg. of $\Delta^{4,5}$-3,11-diketo-17 ($\beta$)-20,21-trihydroxypregnene were dissolved in .5 cc. of absolute dioxane with heating. The solution was cooled to room temperature and treated with a mixture of 63.5 mg. of pyridine and 68.5 mg. of acetic anhydride, and permitted to stand at room temperature overnight. Water was then added, the mixture concentrated in vacuo and extracted with chloroform. The chloroform solution was washed with water, concentrated to dryness, and the residue purified by chromatography. The 21-monoacetate so obtained in about 90% yield had a melting point of 172°—174° C.

A solution of 165 mg. of $\Delta^{4,5}$-3,11-diketo-17 ($\beta$) 20-dihydroxy-21-acetoxypregnene in 13 cc. of glacial acetic acid and 2 cc. of water was cooled to 11° C. and treated with 85 mg. of chromic acid in 1.6 cc. of water. The solution was kept at 11° C. for 15 minutes, then at 24° C. for 75 minutes. The excess chromic acid was neutralized with a few drops of dilute sodium sulfite solution and the solvent removed in vacuo. The residue was extracted with chloroform, washed successively with dilute sodium carbonate solution and water, and concentrated to dryness in vacuo. The residue was dissolved in a small volume of benzene and chromatographed on a column containing 5 grams of neutral alumina previously activated at 150° C. The elution of the chemical compound from the column was carried out by the addition of 20 cc. portions of solvents, beginning with absolute ether, proceeding through ether-chloroform mixtures with an increasing proportion of chloroform, and finally with pure chloroform. Each fraction was worked up by itself. The initial fractions consisted of $\Delta^{4,5}$-3,11,17-triketoandrostene, having a melting point of 222°–224° C. $[\alpha]_D+281°$, while the latter fractions consisted of $\Delta^{4,5}$-3,11,20-triketo-17 ($\beta$)-hydroxy - 21 - acetoxypregnene, having a melting point of 235°–238° C. $[\alpha]_D+164°$.

The temperatures mentioned in the example are room temperatures unless otherwise indicated. The temperatures, however, are not critical and the reactions may be carried out at higher or lower temperatures; but extremely high temperatures should be avoided because of the likelihood of decomposition of the desired products which may result from operation at such temperatures.

Unless otherwise stated, the reagents can be used in different proportions than are indicated in the above example as the proportions unless otherwise indicated are not critical, although enough of the reagents should be employed to insure substantially complete reaction to produce the desired products.

The specific rotation for $\Delta^{4,5}$-3,11,20-triketo-17 ($\beta$)-hydroxy-21-acetoxypregnene indicated by the symbol $[\alpha]_D$, was determined in acetone solution using the D line of sodium.

Various changes and modifications might be made in any invention as defined herein without departing from the scope thereof. It is my intention that these changes and modifications, to the extent that they are comprehended within the scope of the appended claims, shall be considered as part of my invention.

What is claimed is:

1. The process that comprises partially esterifying $\Delta^{4,5}$-3,11-diketo-17,20,21-trihydroxypregnene by reaction with substantially the theoretical quantity of an acylating agent required to esterify one hydroxyl group, reacting the resultant ester with an oxidizing agent, and recovering a mixture containing $\Delta^{4,5}$-3,11,20-triketo-17-hydroxy-21-acyloxypregnene and $\Delta^{4,5}$-3,11,17-triketoandrostene.

2. The process that comprises partially esterifying $\Delta^{4,5}$-3,11-diketo-17,20,21-trihydroxypregnene by reaction with substantially the theoretical quantity of acetic anhydride required to esterify one hydroxyl group, reacting the resultant ester with chromium trioxide and recovering a mixture containing $\Delta^{4,5}$-3,11,20-triketo-17-hydroxy-21-acyloxypregnene and $\Delta^{4,5}$-3,11,17-triketoandrostene.

3. The process that comprises hydrolyzing $\Delta^{4,5}$-3,11-diketo-17-hydroxy-20,21-diacyloxypregnene to produce $\Delta^{4,5}$-3,11-diketo-17,20,21-trihydroxypregnene, partially esterifying the last-named compound by reaction with an acylating agent to produce $\Delta^{4,5}$-3,11-diketo-17,20-dihydroxy-21-acyloxypregnene, and reacting the latter substance with an oxidizing agent to form a mixture containing $\Delta^{4,5}$-3,11,20-triketo-17-hydroxy-21-acyloxypregnene and $\Delta^{4,5}$-3,11,17-triketoandrostene.

4. The process that comprises hydrolyzing $\Delta^{4,5}$-3,11-diketo-17-hydroxy-20,21-diacyloxypregnene to produce $\Delta^{4,5}$-3,11-diketo-17,20,21-trihydroxypregnene, partially esterifying the last-named compound by reaction with acetic anhydride to produce $\Delta^{4,5}$-3,11-diketo-17,20-dihydroxy-21-acyloxypregnene, and reacting the latter substance with chromium trioxide to form a mixture containing $\Delta^{4,5}$-3,11,20-triketo-17-hydroxy-21-acyloxypregnene and $\Delta^{4,5}$-3,11,17-triketoandrostene.

LEWIS H. SARETT.

REFERENCES CITED

The following references are of record in the file of this patent:

UNITED STATES PATENTS

| Number | Name | Date |
|---|---|---|
| 2,322,809 | Logemann | June 29, 1943 |
| 2,365,292 | Ruzicka | Dec. 19, 1944 |